(12) United States Patent
Izenson et al.

(10) Patent No.: US 7,189,468 B2
(45) Date of Patent: Mar. 13, 2007

(54) LIGHTWEIGHT DIRECT METHANOL FUEL CELL

(75) Inventors: Michael G. Izenson, Hanover, NH (US); Christopher J. Crowley, Lyme, NH (US); Wayde H. Affleck, Enfield, NH (US)

(73) Assignee: Creare Inc., Hanover, NH (US)

( * ) Notice: Subject to any disclaimer, the term of this patent is extended or adjusted under 35 U.S.C. 154(b) by 505 days.

(21) Appl. No.: 10/100,672

(22) Filed: Mar. 18, 2002

(65) Prior Publication Data

US 2002/0132153 A1 Sep. 19, 2002
US 2007/0015035 A1 Jan. 18, 2007

Related U.S. Application Data

(60) Provisional application No. 60/276,314, filed on Mar. 16, 2001.

(51) Int. Cl.
*H01M 8/02* (2006.01)

(52) U.S. Cl. .................................. 429/34; 429/41

(58) Field of Classification Search ............ 429/38–39, 429/34, 41
See application file for complete search history.

(56) References Cited

U.S. PATENT DOCUMENTS

| | | | |
|---|---|---|---|
| 4,175,165 A | 11/1979 | Adlhart | 429/30 |
| 4,810,597 A | 3/1989 | Kumagai et al. | 429/22 |
| 4,855,193 A | 8/1989 | McElroy | 429/30 |
| 5,234,776 A | 8/1993 | Koseki | 429/30 |
| 5,362,578 A | 11/1994 | Petri et al. | 429/35 |
| 5,376,472 A | 12/1994 | Hartvigsen et al. | 429/32 |
| 5,503,944 A | 4/1996 | Meyer et al. | 429/13 |
| 5,514,487 A | 5/1996 | Washington et al. | 429/39 |
| 5,521,018 A | 5/1996 | Wilkinson et al. | 42/26 |
| 5,573,866 A | 11/1996 | Van Dine et al. | 429/13 |
| 5,723,228 A | 3/1998 | Okamoto | 429/12 |
| 5,766,786 A | 6/1998 | Fleck et al. | 429/17 |
| 5,928,807 A | 7/1999 | Elias | 429/35 |
| 5,952,118 A | 9/1999 | Ledjeff et al. | 429/32 |
| 5,952,119 A * | 9/1999 | Wilson | 429/34 |
| 5,981,098 A | 11/1999 | Vitale | 429/34 |
| 6,007,933 A * | 12/1999 | Jones | 429/38 |
| 6,015,634 A | 1/2000 | Bonville, Jr. et al. | 429/17 |
| 6,040,076 A | 3/2000 | Reeder | 429/35 |

(Continued)

*Primary Examiner*—Mark Ruthkosky
(74) *Attorney, Agent, or Firm*—Downs Rachlin Martin PLLC

(57) ABSTRACT

A lightweight direct methanol fuel cell unit (20) comprising a fuel cell stack (24) enclosed within a housing (22). In one embodiment the fuel cell stack includes a plurality of polymer electrolyte membrane electrode assemblies (52) stacked alternatingly with a plurality of bipolar plates (48). Each bipolar plate includes a cathode flow field (78) defined by a porous cathode flow field structure (56) and an anode flow field (62) defined by an upper plate (58) and a lower plate (60) separated from one another by a plurality of spacers (64). The anode flow fields are manifolded with one another via manifold embossments (118, 120) that are hermetically sealed with one another with a gasket (126). The fuel cell stack and housing are shaped so as to form four manifold regions (36) in the spaces between the fuel cell stack and housing. The fuel cell stack is compressed within the housing by compression members (94) located between the fuel cell stack and housing so as to place the sidewall (30) of the housing into tension. Supporting systems for the fuel cell unit include a fuel handling system (502), an oxidant handling system (600), and a liquid inventory control system (700).

47 Claims, 8 Drawing Sheets

U.S. PATENT DOCUMENTS

| | | |
|---|---|---|
| 6,066,408 A | 5/2000 | Vitale et al. ................... 429/26 |
| 6,066,409 A | 5/2000 | Ronne et al. ................. 429/39 |
| 6,110,613 A | 8/2000 | Fuller ......................... 429/17 |
| 6,132,895 A | 10/2000 | Pratt et al. .................... 429/39 |
| 6,146,781 A | 11/2000 | Surampudi et al. ........... 429/35 |
| 6,159,629 A | 12/2000 | Gibb et al. ................... 429/39 |
| 6,232,010 B1 | 5/2001 | Cisar et al. ................... 429/40 |
| 6,254,748 B1 | 7/2001 | Surampudi et al. ......... 204/422 |
| 6,255,012 B1 | 7/2001 | Wilson et al. ................ 429/38 |
| 6,277,508 B1 | 8/2001 | Reiser et al. ................. 429/17 |
| 6,296,964 B1 * | 10/2001 | Ren et al. ..................... 429/38 |
| 6,303,244 B1 | 10/2001 | Surampudi et al. ........... 429/17 |
| 6,322,914 B1 | 11/2001 | Chow et al. .................. 429/13 |
| 6,329,093 B1 | 12/2001 | Ohara et al. .................. 429/32 |
| 6,350,540 B1 * | 2/2002 | Sugita et al. ................. 429/39 |
| 2001/0028971 A1 | 10/2001 | Matejcek ..................... 429/26 |
| 2001/0049044 A1 | 12/2001 | Molter ........................ 429/34 |
| 2002/0001743 A1 | 1/2002 | Davis .......................... 429/34 |
| 2002/0009630 A1 | 1/2002 | Gao et al. ..................... 429/34 |

* cited by examiner

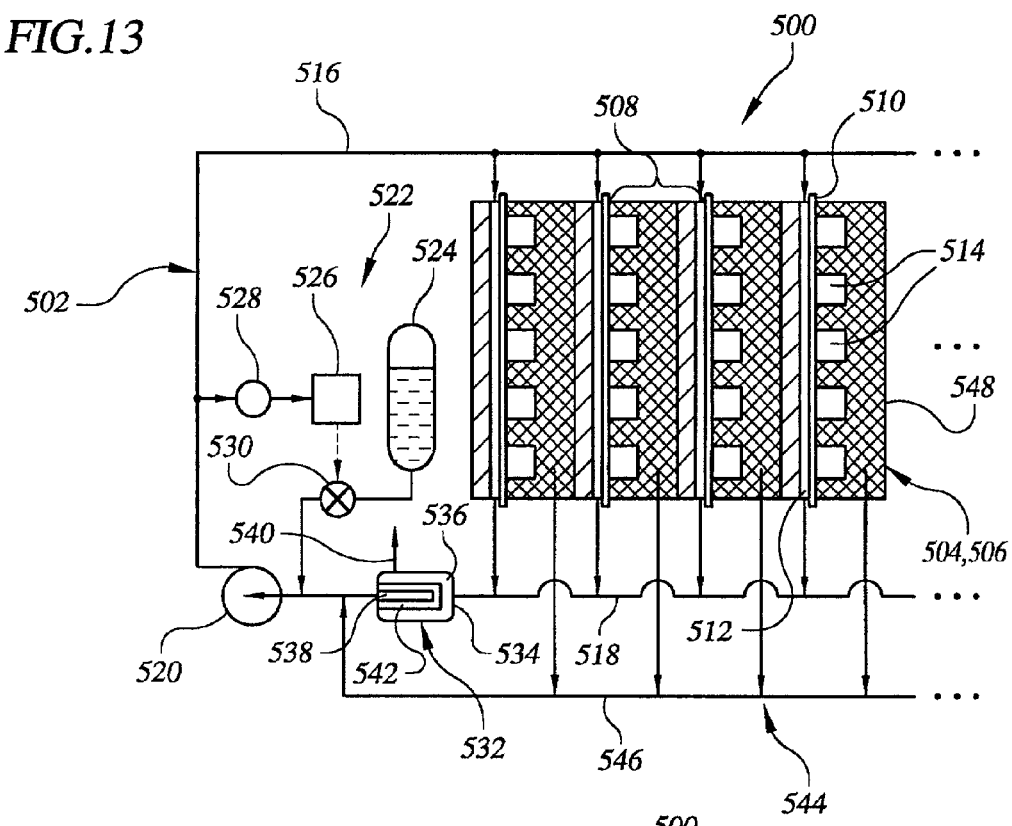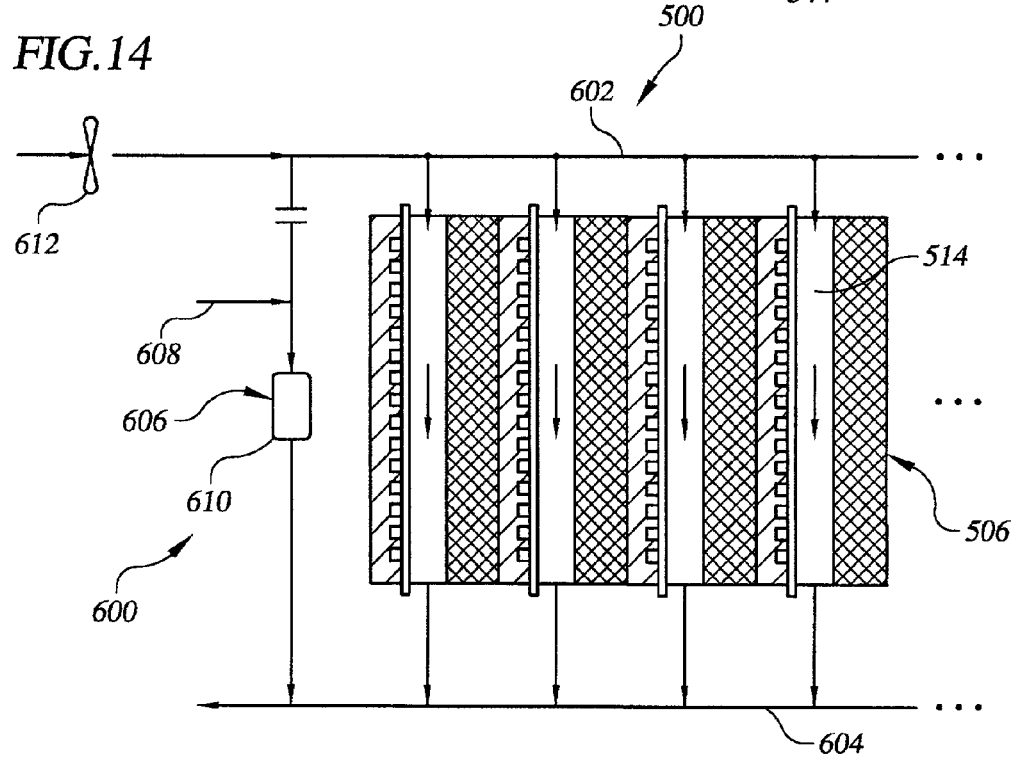

LIGHTWEIGHT DIRECT METHANOL FUEL CELL

RELATED APPLICATION DATA

This application claims the benefit of priority of U.S. Provisional Patent Application No. 60/276,314, filed Mar. 16, 2001, entitled "Compact, Lightweight Direct Methanol Fuel Cell."

STATEMENT OF GOVERNMENT RIGHTS

This invention was made with Government support under contract MDA972-01-C-0070 awarded by the Defense Advanced Research Project Agency. The Government has certain rights in the invention.

FIELD OF THE INVENTION

The present invention is generally related to the field of fuel cells. More particularly, the present invention is directed to a lightweight fuel cell stack and supporting systems therefor.

BACKGROUND OF THE INVENTION

A fuel cell electrochemically converts a fuel and an oxidant into direct current electricity that may be used to power any of a variety of electrical devices, such as electromechanical equipment, e.g., motors and actuators, digital and analog circuits, e.g., microprocessors and radio transmitters, and other electrical equipment, e.g., heaters and sensors, among others. Fuel cells are generally categorized by the type of fuel, e.g., methanol or hydrogen, and the type of electrolyte, e.g., solid polymer, solid oxide, molten carbonate and phosphoric acid, used to effect the electrochemical process within the fuel cell.

One type of fuel cell that has emerged as a popular variant is the proton exchange membrane (PEM) (also known as "polymer electrolyte membrane") type fuel cell. The PEM is a thin sheet of polymer that allows hydrogen ions (protons) to pass through it. When used in a fuel cell, the side of the PEM in contact with the fuel is in electrical contact with an anode electrode and the side of the PEM in contact with the oxidant is in electrical contact with a cathode electrode. Hydrogen from the fuel side of the cell ionizes and passes through the PEM to combine with oxygen on the oxidant side of the cell. As each hydrogen ion enters the anode electrode, an electron is split from the hydrogen atom. These freed electrons then become the source of electric current that can power an external load.

During operation, a hydrogen-rich fuel is provided to the anode side of the PEM as the source of hydrogen atoms that provide the ions and electrons during the electrochemical process that splits the electrons and ions from one another. An oxidant, typically oxygen via air, is provided to the cathode side of the PEM. When the hydrogen ions passing through the PEM reach the cathode side of the PEM, they combine with oxygen to produce water.

A popular type of PEM fuel cell utilizes methanol as the source of hydrogen atoms for the electrochemical reaction with the PEM. Methanol/PEM fuel cells are desirable due to their relatively low operating temperatures, generally innocuous byproducts, e.g., carbon dioxide and water, and ease of storing the methanol fuel under standard conditions. At standard conditions, i.e., standard temperature and pressure, methanol is liquid. Thus, the methanol fuel is typically stored in conventional liquid-type fuel tanks. In contrast, other types of fuel cells, e.g., hydrogen fuel cells, typically require their fuels to be stored under non-standard conditions. For example, hydrogen fuel may be stored as a cryogenic liquid or a pressurized gas. Liquefying hydrogen at cryogenic temperatures is an expensive process, and storing liquefied hydrogen requires bulky insulated containers that vent and lose hydrogen due to heat leaks. Similarly, compressing and storing hydrogen gas is relatively costly, and storing this highly flammable gas is more problematic than storing liquid methanol.

Early methanol fuel cell systems included a reformer, e.g., a steam reformer, that stripped from the methanol molecules the hydrogen necessary for the electrochemical reaction with the electrolyte that produced the electricity. The present focus of methanol fuel cells, however, is on direct methanol fuel cells in which the liquid methanol fuel is circulated into direct contact with the anode, rather than just the hydrogen atoms split from the methanol molecules. In lieu of the reformer, a methanol break-down catalyst is typically provided adjacent the PEM to remove the hydrogen atoms from the methanol molecules. Direct methanol fuel cells have the advantages of, among other things, lighter weight, reduced complexity, and lower cost due to the elimination of the reformer.

In general, to provide a usable amount of electricity all direct methanol fuel cells require a PEM having a relatively large surface area. This is typically accomplished by providing a plurality of PEMs, a plurality of fuel (anode) flow fields, and a plurality of oxidant (cathode) flow fields stacked alternately with one another to form a generally compact fuel cell stack, which is typically enclosed within a housing. The anode and cathode flow fields are typically provided by plates made from various materials and having channels or other flow regions formed therein. Since parallel anode flow fields, and parallel cathode flow fields, are spaced from one another, manifolds must be provided to distribute the fuel and oxidant to all of the corresponding flow fields. Depending upon a particular design of a direct methanol fuel cell system, the fuel cell stack must be supported by a variety of supporting systems, which may include a fuel storage and delivery system, a fuel recirculation system, a carbon dioxide removal system, an oxidant delivery system, a cathode exhaust system, a water circulation system, and/or a cooling system, among others.

Fuel cell system designers are continually striving to reduce the complexity of fuel cell systems for a number of reasons including lower cost, manufacturing efficiency, and reduced maintenance. In addition, since important applications for fuel cells include, among other things, manned and unmanned spacecraft, terrestrial vehicles, and portable electronic equipment, such as computers and cell phones and similar devices, designers are also continually striving to decrease the weight and size of fuel cell stacks, housings, and supporting systems.

SUMMARY OF INVENTION

In one aspect, the present invention is directed to a fuel cell unit. The fuel cell unit comprises at least one flow field structure that includes a first plate having a plurality of apertures. A second plate confronts the first plate so as to form a flow field between the first plate and the second plate. A membrane electrode assembly confronts the first plate.

In another aspect, the present invention is directed to a fuel cell unit comprising a fuel cell stack. The fuel stack comprises a plurality of first flow field structures each having an outer periphery. A plurality of second flow field structures are located alternatingly with the plurality of first flow field structures. Each of the plurality of second flow field structures defines a cavity for receiving a fluid. Each cavity has first portion extending radially outward of the outer periphery of each immediately adjacent second flow field structure. Each of the first portions fluidly communicating with at least one adjacent first portion radially outward of the outer periphery of each immediately adjacent second flow field structure.

In a further aspect, the present invention is directed to a fuel cell unit comprising a fuel cell stack that comprises a plurality of first flow field structures each defining a flow field having an outer periphery. A plurality of second flow field structures are located alternatingly with respect to the plurality of first flow field structures. Each of the plurality of second flow field structures has a portion extending beyond the outer periphery of each immediately adjacent first flow field structure. A plurality of sealing members are each located radially outward of the outer periphery of a corresponding one of the plurality of first flow fields structures and confront two of the plurality of second flow field structures.

In yet another aspect, the present invention is directed to a fuel cell system that has a fluid inventory and utilizes a recirculated fluid having a temperature. The fuel cell system comprises at least one anode flow field for conducting the recirculated fluid and a fluid inventory control system. The fluid inventory control system comprises a sensor for measuring the fluid inventory. The sensor generates a first control signal. A first flowpath extends from the at least one anode flow field to the sensor. At least one second flowpath is in fluid communication with the first flowpath and extends from the sensor to the first anode flow field. A device is operatively coupled to the sensor for controlling the temperature of the recirculated fluid in response to the first signal.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein:

FIG. 13 is a schematic diagram of a fuel handling system of the present invention;

FIG. 14 is a schematic diagram of an oxidant handling system of the present invention.

DETAILED DESCRIPTION OF THE INVENTION

Figure 1:
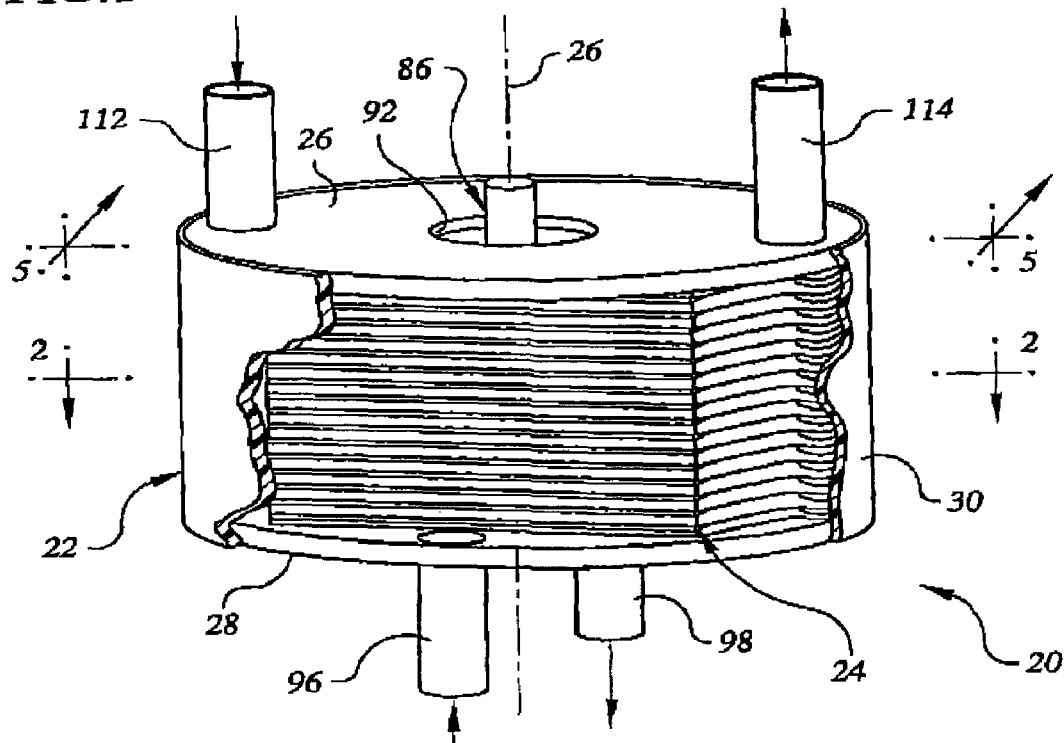
FIG. 1 is a perspective view of a fuel cell stack and housing according to the present invention.

Referring now to the drawings, wherein like numerals indicate like elements, FIG. 1 illustrates in accordance with the present invention a fuel cell unit, which is generally denoted by the numeral 20. As will become apparent from the accompanying drawings and corresponding description, fuel cell unit 20, alone and in conjunction with the various supporting systems described below, contains a number of innovative features that can result in reduced size, weight, cost, and complexity of the fuel cell unit and the supporting systems when compared to conventional fuel cell systems having comparable power outputs. Such reductions are important in developing practical fuel cell units and supporting systems. These reductions are a result of a number of factors, including innovative choice of materials for, and design of, the various components of fuel cell 20 unit and supporting systems and innovative approaches to supporting the operation of the fuel cell unit.

As shown in FIG. 1, fuel cell unit 20 may comprise a housing 22 and a fuel cell stack 24 contained within the housing. Housing 22 may include an upper wall 26, a lower wall 28, and a sidewall 30 extending between the upper wall and lower wall, typically but not necessarily, in a direction parallel to the central axis 32 of fuel cell unit 20. As used herein, the terms "upper" and "lower" are used for convenience to express the relative position of the corresponding elements as they appear in the appurtenant drawings. Elements modified by these terms, of course, can be located at orientations other than those shown in the drawings.

Figure 2:
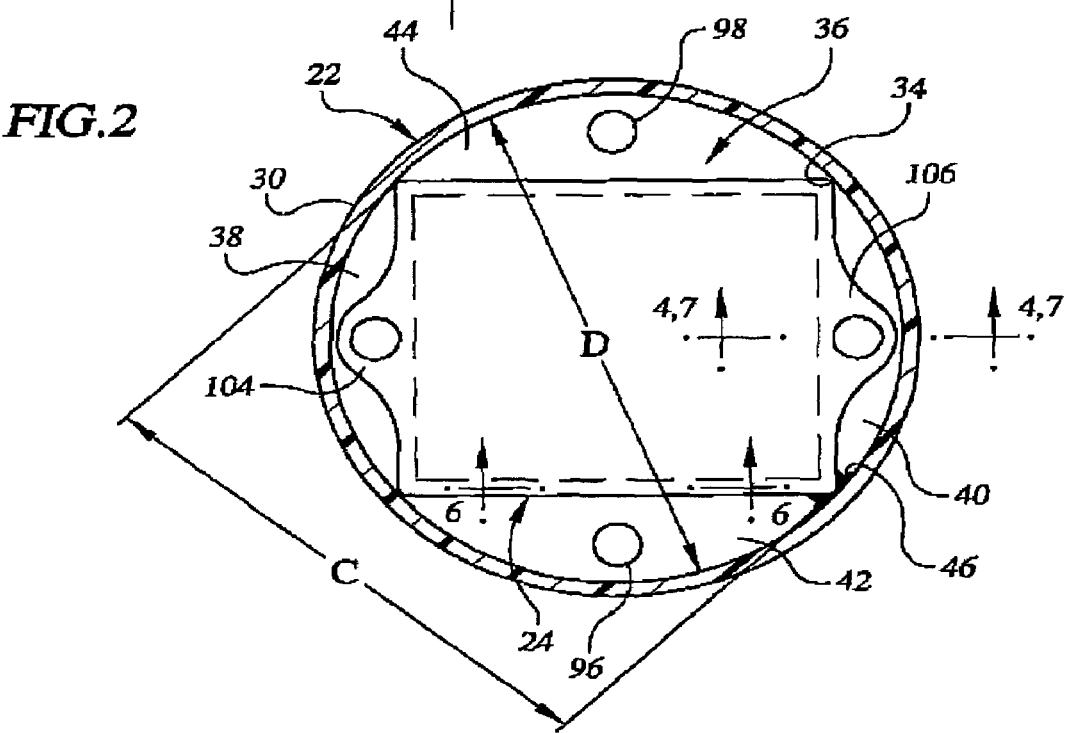
FIG. 2 is a cross-sectional view of the fuel cell stack and housing as taken along line 2—2 of FIG. 1.

As shown more particularly in FIG. 2, sidewall 30 of housing 22 may form a cylinder having an inside diameter D. Correspondingly, fuel cell stack 24 may have a rectangular transverse cross-sectional shape generally having four vertices 34 so as to generally define four manifold regions 36, e.g., an anode inlet manifold region 38, an anode outlet manifold region 40, a cathode inlet manifold region 42, and a cathode outlet manifold region 44, between fuel cell stack 24 and housing 22. The distance C between diagonally opposing vertices 34 may be slightly less that inside diameter D of housing 22 so as to form an interference fit between fuel cell stack 24 and sidewall 30 that may aid sealing adjacent manifold regions 36 from one another. To further improve the seals between adjacent manifold regions 36, a sealing member 46, such as a formed gasket or caulk bead, may be provided. Sealing member 46 may be made of any suitable material, such as silicone or Viton® rubber (Viton® is a registered trademark of E.I. DuPont de Nemours and Company Corporation, Wilmington, Del.). Those skilled in the art will appreciate that distance C may be equal to or less than inside diameter D and that the sealing detail between vertices 34 of fuel cell stack 24 and housing 22 may need to be modified accordingly.

Although sidewall 30 is shown as being circular in shape and fuel cell stack 24 is shown as being rectangular in shape so as to form four generally circular-segment manifold regions 36 with housing 22, the shapes of the sidewall and the fuel cell stack may be any desired. For example, fuel cell stack 24 may be circular and sidewall 30 may be square so as to form generally triangular manifold regions adjacent the vertices of the square sidewall. Other examples include a rectangular fuel cell stack contained in an elliptical sidewall or a quadrilateral fuel cell stack contained in a quadrilateral sidewall, wherein the fuel cell stack is smaller that the housing and is rotated relative to the housing so as to form four triangular manifold regions. Those skilled in the art will appreciate the variety of shape combinations that may be used to form manifold regions 36 between fuel cell stack 24 and housing 22. In addition, fuel cell stack 24 may be shaped and sized to conformally and snugly fit within housing 22 so as not to form any manifold regions. In such an embodiment, manifolds for fuel cell stack 24 may be provided either external to housing 22 or within the fuel cell stack. However, those skilled in the art will appreciate that creating manifold regions 36 between fuel cell stack 24 and housing 22 may have certain advantages over fuel cell units manifolded external to its housing or within its fuel cell stack.

Figure 3:
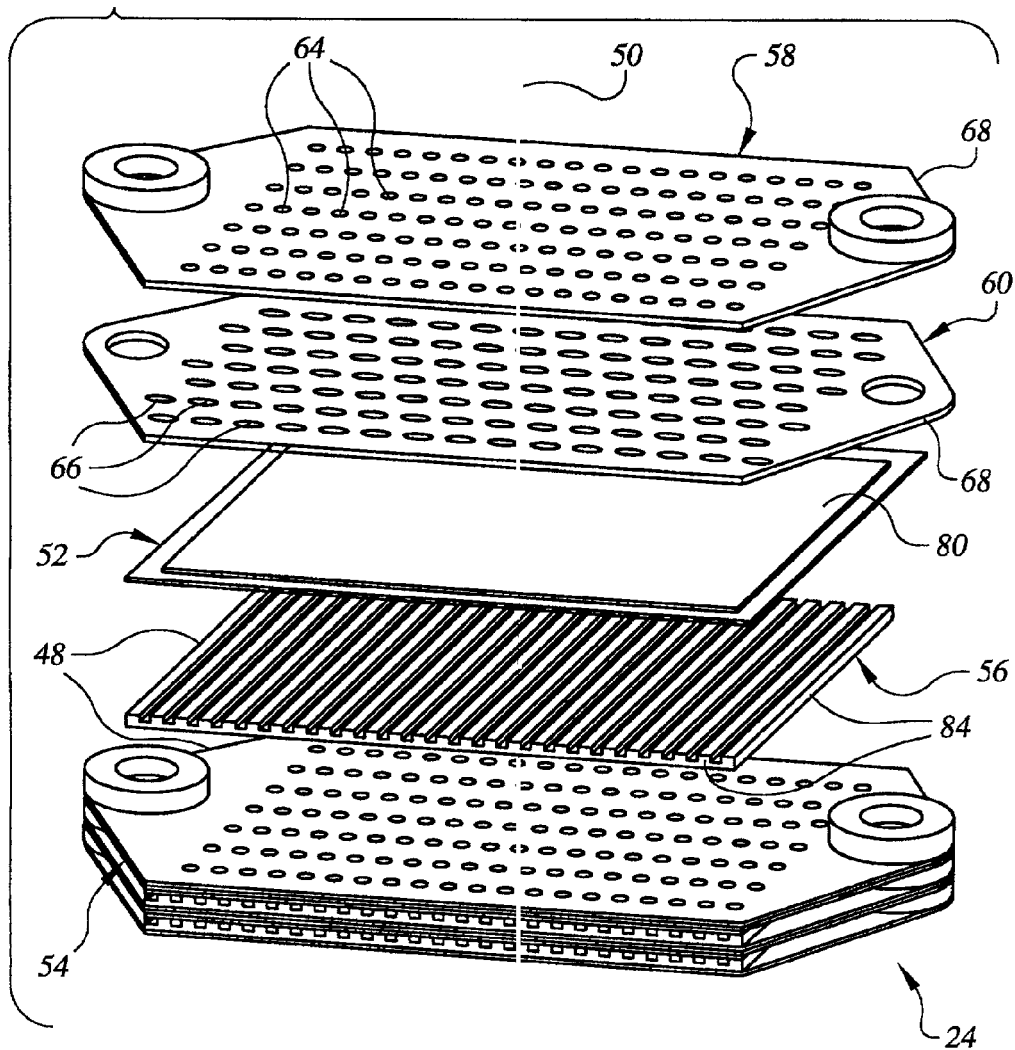
FIG. 3 is a partially exploded perspective view of a portion of the fuel cell stack of the fuel cell unit of FIG. 1.
Figure 4:
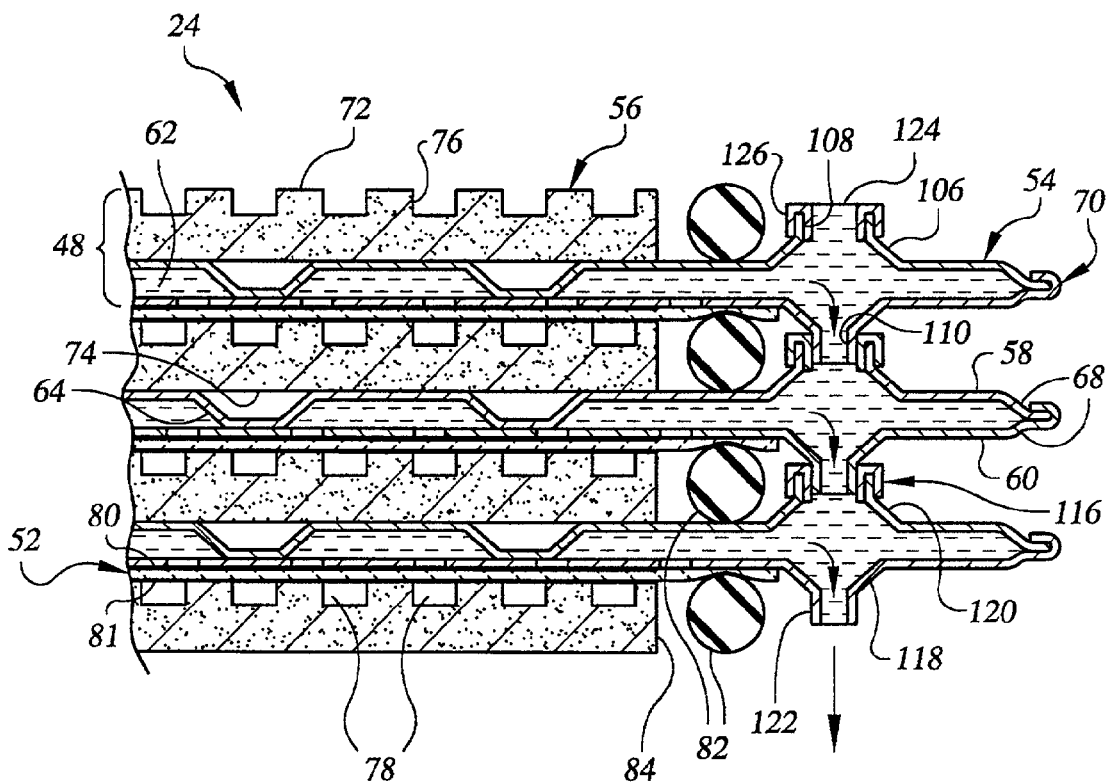
FIG. 4 is an enlarged partial cross-sectional view of the fuel cell stack as taken along line 4—4 of FIG. 2 showing a system for sealing anode flow fields and cathode flow fields from one another.

Referring to FIGS. 3 and 4, fuel cell stack 24 may comprise a plurality of bipolar plates 48 stacked with one another along a stacking axis 50 and generally separated from one another by membrane electrode assemblies 52. Each bipolar plate 48 generally includes an anode flow field structure 54 and a cathode flow field structure 56. Each anode flow field structure 54 may comprise an upper plate 58 and a lower plate 60 that together define an anode flow field 62 for receiving a fuel. Upper and lower plates 58, 60 may be made of any conductive material, such as metal or pyrolytic graphite sheets, among others. In the embodiment shown, upper and lower plates 58, 60 are made of stainless steel coated with a relatively thin layer of gold to improve electrical conductivity and prevent corrosion. Upper and lower plates 58, 60 may be any thickness desired. However, in the present embodiment, upper and lower plates may have a thickness of about 0.025 mm to about 0.250 mm.

Upper plate 58 may contain a plurality of spacers 64 that contact lower plate 60 so as to form anode flow field 62 and provide structures for preventing anode flow field structure 54 from deforming significantly when fuel cell stack 24 is compressed with housing 22 (FIG. 1), as discussed below. Spacers also provide many points of electrical contact between upper plate 58 and lower plate 60. As those skilled in the art will readily appreciate, spacers 64 may be either formed integrally with upper plate 58 or lower plate 60 or may be formed separate from both the upper and lower plates and secured between the upper and lower plates in any manner known in the art. However, in the present embodiment, spacers 64 are formed integrally with upper plate 58 using a stamping, or embossing, process. Such embossing processes are known in the art and, therefore, need not be described in detail herein. For example, upper and lower plates 58, 60 may be fabricated using the techniques described in U.S. Pat. No. 6,170,568 to Valenzuela entitled "Radial Flow Heat Exchanger," which is incorporated by reference herein.

Lower plate 60 may contain a plurality of apertures 66 that allow anode flow field 62 to fluidly communicate with membrane electrode assembly 52. As those skilled in the art will readily appreciate, apertures 66 may be any shape and size, and arranged in any pattern, desired to suit a particular design. For example, as shown, apertures 66 are elongated slots having a length of about 4 mm and a width of about 2 mm and are arranged in a staggered pattern. The arrangement of spacers 64 and apertures 66 may be coordinated with one another so that the spacers contact the upper surface of lower plate 60 when upper plate 58 and the lower plate are in their proper position with respect to one another.

Figure 5:
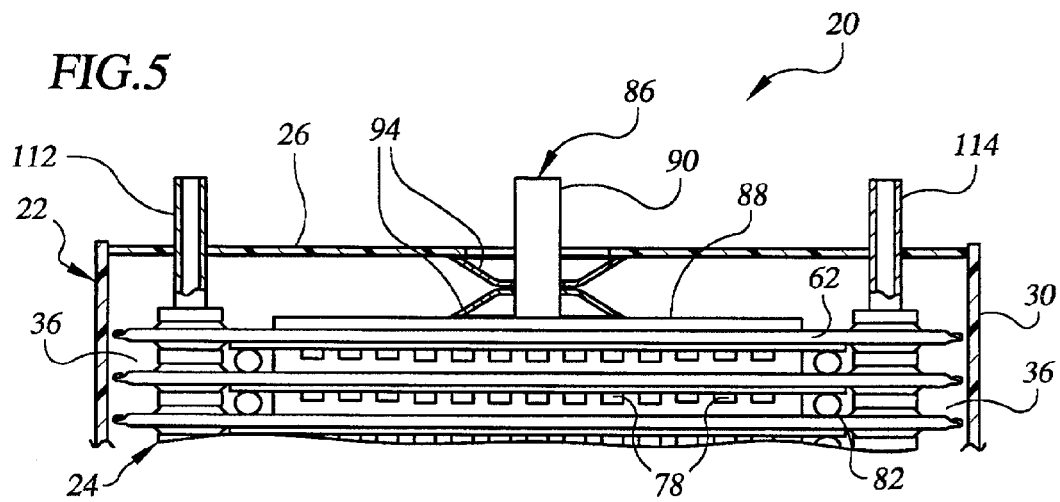
FIG. 5 is a partial cross-sectional view of the fuel cell unit as taken along line 5—5 of FIG. 1 showing compression members for compressing the fuel cell stack.

Upper plate 58 and lower plate 60 may be secured to one another at their respective peripheral regions 68 to create a fluid seal between anode flow field 62 and regions located radially outward from anode flow field structure 54. For example, as shown in FIG. 5, peripheral regions 68 may be secured to one another with a folded and crimped joint 70 similar to the crimped joint between the sidewall and top of a conventional soda can. Crimped joint 70 may be augmented with a sealant (not shown), such as silicone, if needed. Alternatively to crimped joint 70, peripheral regions 68 may be secured to one another by other means, such as diffusion bonding, sealing with epoxy, or welding, among others.

Each cathode flow field structure 56 may be a plate having an upper side 72, a lower side 74 and a plurality of channels 76 formed in at least one of the tipper and lower sides to provide a cathode flow field 78. Cathode flow field structure 56 may be made of a microporous material, such as porous pyrolytic graphite (PPG) or conductive porous metal/ceramic composite materials, among others. As described below, a microporous material, such as PPG, may be desirable from a liquid-management perspective. As shown, cathode flow field structure 56 may contain a plurality of straight channels 76 adjacent to membrane electrode assembly 52 extending from one end of the cathode flow field structure to an apposing end. Those skilled in the art, however, will appreciate that cathode flow field structure may 56 include any configuration of channel(s) 76, including a single serpentine channel, required to suit a particular design.

Membrane electrode assembly 52 may comprise any type of electrolyte suitable for the type of fuel cell unit that fuel cell unit 20 is designed to be. In the present embodiment, fuel cell unit 20 may be a direct methanol type fuel cell unit. Accordingly, membrane electrode assembly 52 may comprise a polymer electrolyte membrane (PEM) (also known as a "proton exchange membrane"), such as a Nafion® membrane available from E.I. DuPont de Nemours and Company Corporation, Wilmington, Del. Those skilled in the art will appreciate that the membrane electrode assembly 52 will comprise another material, such as a solid oxide, molten carbonate or phosphoric acid, among others. Membrane electrode assembly 52 also comprises an anode electrode 80 located adjacent anode flow field structure 54 and a cathode electrode 81 located adjacent cathode flow field structure 56. Depending upon the type of fuel cell, membrane electrode assembly 52 may include catalyst layers (not shown) on one or both of its electrodes 80, 81 that react with the methanol fuel to free the hydrogen molecules therefrom. For example, in a direct methanol fuel cell utilizing a PEM electrolyte, the PEM may be joined to sheets of carbon paper that make up anode and cathode electrodes 80, 81. Anode and cathode electrodes 80, 81 can be coated with a relatively thin layer of platinum, or other catalyst. Alternatively, a catalyst such as platinum black can be applied directly to the PEM.

Anode flow field 62 and cathode flow field 78 may be fluidly sealed from one another with a sealing member 82 located between adjacent anode flow field structures 54. Sealing member 82 may be a gasket, e.g., an "O-ring" having a shape corresponding generally to the shape of the outer periphery 84 of cathode flow field structure 56. Of course, sealing member 82 may be another shape, if desired. Sealing member 82 may be made of a suitable compressible material, such as silicone or Viton® rubber. In the embodiment shown, membrane electrode assembly 52 extends radially beyond sealing member 82 generally to simplify the fluid seal between anode and cathode flow fields 62, 78.

Referring again to FIG. 1, and also to FIG. 5, fuel cell unit 20 may further include a terminal 86 located at the upper end of fuel cell stack 24. Terminal 86 may include a plate 88 located within housing 22 and a contact 90 that extends through a corresponding aperture 92 in upper end wall 26 of the housing. A mentioned, it may be desirable to maintain fuel cell stack 24 in compression within housing 22. This is generally so to maintain good electrical contact throughout stack 24. Axial compression also increases the effectiveness of sealing members 82 (FIGS. 3 and 4) to prevent cross-leakage between anode and cathode flow fields 62, 78 and between the anode and cathode flow fields and manifold regions 36 where appropriate.

Fuel cell stack 24 may be maintained in compression in any of a number of different ways. For example, as shown in FIG. 5, one or more compression members 94 may be placed between housing 22 and terminal plate 88. Each compression member 94 may be a Belleville-type disc spring, a leaf spring, a coil spring, a silicone gasket, or any other resilient compressible body. Alternatively, the height along stacking axis of uncompressed fuel cell stack 24 and any relatively rigid bodies stacked therewith, e.g., plate 88 of terminal 86, may be made somewhat smaller than the distance between upper end wall 26 and lower end wall 28 of housing 22. Thus, when fuel cell stack 24 is inserted into housing 22 it must be compressed accordingly for the housing to be properly sealed. When fuel cell stack 24 is compressed within housing 22 in either of the above-described manners, sidewall 30 of the housing is placed into tension to counteract the compressive force induced into the fuel cell stack. This allows housing 22 to provide at least two functions, that of a housing and a tensile member, that in conventional fuel cell units are typically provided by separate structures. Accordingly, this consolidation of functions can result in a weight savings with respect to conventional fuel cell units. Those skilled in the art will understand that other means exist for maintaining fuel cell stack in compression, including conventional means, such as tension rods extending through the fuel cell stack, among others.

Figure 6:
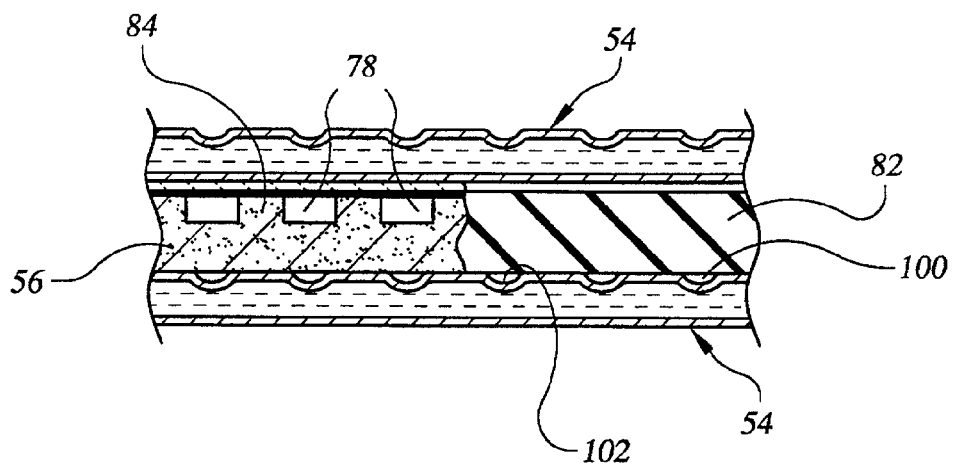
FIG. 6 is an enlarged partial cross-sectional view of the fuel cell stack as taken along line 6—6 of FIG. 2 showing oxidant inlets in conjunction with the sealing system of FIG. 5.

Referring now to FIGS. 1 and 2, housing 22 may further include an oxidant inlet 96 and an oxidant outlet 98 in fluid communication with, respectively, cathode inlet and outlet manifold regions 42, 44. As described below, oxidant inlet 96 may be in fluid communication with an oxidant handling system and oxidant outlet 98 may be in fluid communication with an exhaust system, a liquid inventory system, and/or a fuel handling system, among other systems. FIG. 6 shows a pair of adjacent anode flow field structures 54 and corresponding intermediate cathode flow field structure 56 and membrane electrode assembly 52 to illustrate a manner in which cathode inlet manifold region 42 (FIG. 2) may be in fluid communication with cathode flow field 78 via a plurality of passageways 100 to allow an oxidant to flow therebetween.

Passageways 100 may be defined by the space between sealing member 82 and upper plate 58 at each depression 102 in the upper plate located immediately adjacent the sealing member. Each depression 102 may correspond to a spacer, e.g., embossed spacer 64 (FIGS. 3 and 4), or may be a depression formed particularly for the purpose of creating passageways 100. Sealing member 82 should be radially spaced from the outer periphery 84 of cathode flow field structure 56 so that passageways 100, which are located distal from a plane containing membrane electrode assembly 52, are in fluid communication with channels 76 of the cathode flow field structure located proximate to the plane of the membrane electrode assembly. Depressions 102 may be coated with a material, such as a fluorocarbon, that makes passageways hydrophobic to prevent fluid from blocking the flow of oxidant through the passageways. Those skilled in the art will appreciate that other means may be provided to allow cathode inlet manifold region 42 (FIG. 2) to fluidly communicate with cathode flow field 78. For example, in lieu of, or in addition to, depressions 102 in upper plate 58, sealing member 82 may be provided with transverse grooves and/or apertures (not shown) extending between cathode inlet manifold region 42 and cathode flow field 78. It is noted that passageways 100 may be provided between cathode flow field 78 and cathode outlet manifold 44 (FIG. 2) in a similar manner.

Referring again to FIGS. 2 and 4, each anode flow field structure 54 may contain an inlet manifold region 104 and an outlet manifold region 106. In the embodiment shown, the flow direction of the fuel is generally straight through anode flow field 62. Accordingly, inlet and outlet manifold regions 104, 106 are located at opposing ends of anode flow field structure 54. Other configurations of anode flow field 62 having different fuel flow paths may have inlet and outlet manifold regions 104, 106 at locations other than opposing ends. Each inlet and outlet manifold region 104, 106 may contain an upper manifold aperture 108 in upper plate 58 and a lower manifold aperture 110 in lower plate 60. As those skilled in the art will readily appreciate, if sub-manifolding is desired, each inlet and outlet manifold region 104, 106 may contain more than one each of upper and lower manifold apertures 108, 110. As shown in FIGS. 1 and 5, housing 22 may include a fuel inlet 112 and a fuel outlet 114 in fluid communication with, respectively, inlet and outlet manifold regions 104, 106 of anode flow field structures 54 of fuel cell stack 24. Although fuel inlet 112 and fuel outlet 114 are shown entering housing 22 through upper end wall 26, each may extend through the housing elsewhere, such as through lower end wall 28 or sidewall 30.

FIG. 4 shows a joint 116 between outlet manifold regions 106 of adjacent anode flow field structures 54 that allows corresponding anode flow fields 62 to fluidly communicate with one another. Inlet manifold regions 104 may be joined in the same, or other, manner. Each lower manifold aperture 110 may be formed in a lower embossment 118 of lower plate 60, and each upper manifold aperture 108 may be formed in an upper embossment 120 of upper plate 58. Correspondingly, joint 116 may be comprised of portions of lower and upper embossments 118, 120 and one or more sealing means, if required. For example, each lower embossment 118 may include a cylindrical portion 122 that extends into corresponding upper manifold aperture 108 defined by a similar cylindrical portion 124. A gasket 126, or other sealing means, may be used to seal any space that may be present between the respective cylindrical portions 122, 124 of lower and upper embossments 118, 120.

Gasket 126 shown is generally circular and has a U-shaped cross-sectional shape that allows it to engage cylindrical portion 124 of upper embossment 120. Gasket 126 may allow cylindrical portion 122 of lower embossment 118 to slide relative to upper embossment 120 to allow for any movement that may occur when fuel cell stack 24 is compressed within housing 22 (FIG. 1). Gasket 126 should be made of an insulating material to prevent short circuiting of fuel cell unit 20. Accordingly, gasket 126 may be made of any suitable material, such as silicone or Viton® rubber. Those skilled in the art will appreciate the variety of joints 116 that may be formed between adjacent anode flow structures 54. For example, in contradistinction to joint of FIG. 5, cylindrical portion 124 of upper embossment 120 may be smaller in diameter that cylindrical portion 122 of lower embossment 118 so that it fits within the cylindrical portion of the lower embossment. In addition, cylindrical portions 122, 124 of lower and upper embossments 118, 120 may have the same diameter so that they generally form a butt joint with one another, with or without an intermediate gasket (not shown) or other seal. Moreover, one or both cylindrical portions 122, 124 and/or one or both lower and upper embossments 118, 120 may be eliminated. In this case, a suitable gasket (not shown), such as a compressible toroid-shaped gasket, may surround corresponding adjacent upper and lower manifold apertures 108, 110 to provide a sealing function, if required.

Figure 7:
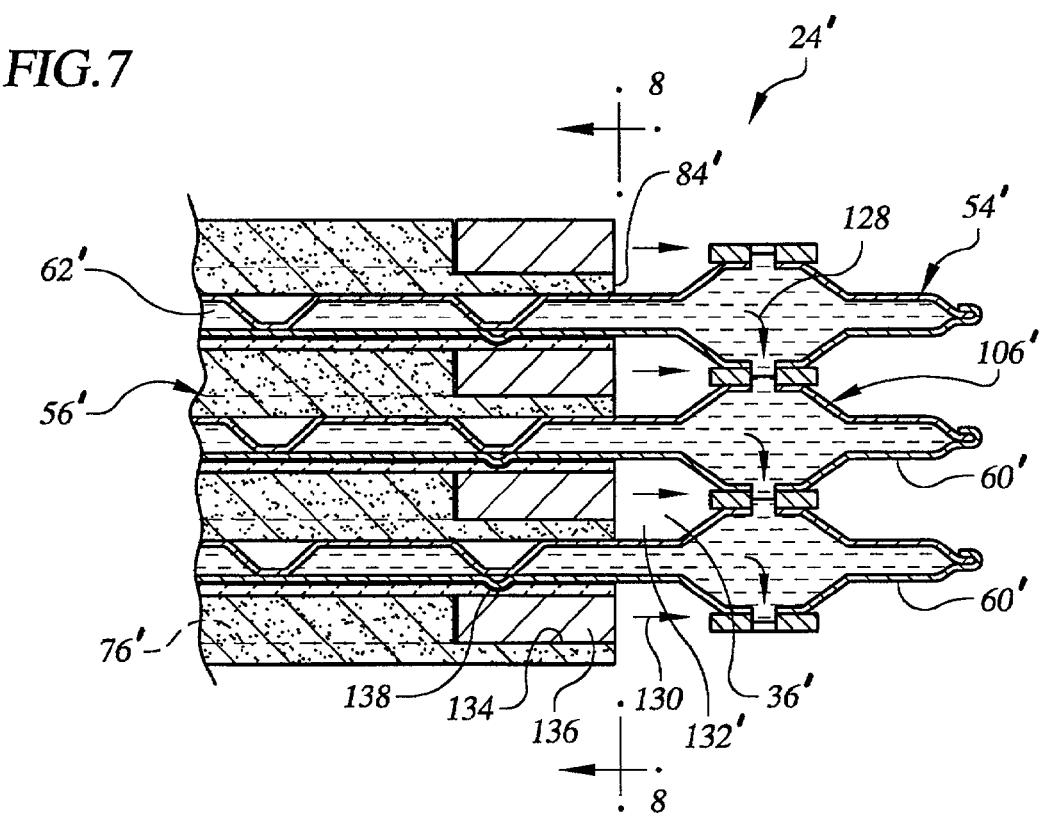
FIG. 7 is an enlarged cross-sectional view of the fuel cell stack as taken along line 7—7 of FIG. 2 showing an alternative system for sealing anode flow fields and cathode flow fields from one another.

FIG. 7 shows an alternative means for sealing anode flow field 62' and cathode flow field 78' (see FIG. 8) from one another within fuel cell stack 24' comprising anode flow field structures 54' and cathode flow field structures 56' similar to the corresponding structures of fuel cell unit 20 of FIGS. 1–6. In this embodiment, however, channels 76' of cathode flow field structure 56' are oriented parallel to the primary direction of fuel flow 128 in anode flow field so that oxidant flow 130 is parallel to the fuel flow and, in this embodiment, in the same direction, too. Accordingly, manifold region 36' may provide at least two functions, that of containing outlet manifold regions 106' of anode flow field structures 54' and providing a cathode outlet manifold 132.

Figure 8:
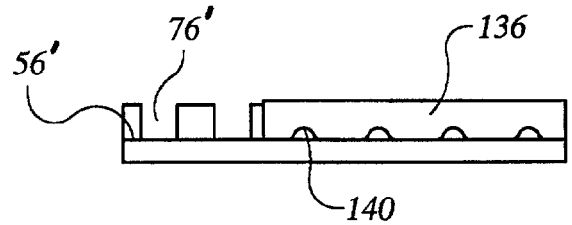
FIG. 8 is a partial cross-sectional view of the fuel cell stack as taken along line 8—8 of FIG. 7 showing oxidant inlets in conjunction with the sealing system of FIG. 7.
Figure 9:
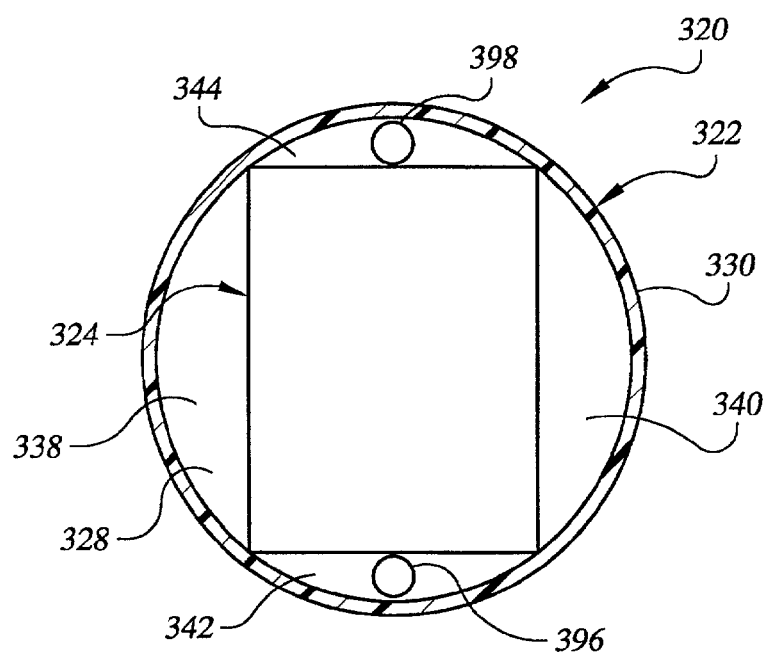
FIG. 9 is a transverse cross-sectional view of an alternative fuel cell unit of the present invention.

Cathode flow field structure 56' may be the same as cathode flow field structure 56 of FIG. 3, except for a rabbet 134 formed therein adjacent and surrounding its outer periphery 84'. Rabbet 134 may contain a support frame 136 made of a substantially impervious material, e.g., graphite or plastic, among others. Lower plate 60' of anode flow field structure 54' may include a sealing member 138 that extends along the length of support frame 136 and effects a fluid seal between anode flow field region 62' and cathode flow field region 78' when membrane electrode assembly 52' is compressed between the sealing member and support frame. Sealing member 138 may be formed integrally with lower plate 60', e.g., by stamping, embossing, or otherwise forming the lower plate. Alternatively, sealing member 138 may be formed separately from lower plate 60'. For example, sealing member 138 may be a gasket, which may or may not be compressible. As shown in FIG. 8, frame member 136 may contain grooves 140 and/or apertures that allow cathode flow field 78' to fluidly communicate with manifold region 36', i.e., cathode outlet manifold 132. The sealing detail shown in FIGS. 7 and 8 may be used at the opposing side, i.e., inlet side, of fuel cell stack 24'. The sides of fuel cell stack 24' parallel to the direction of flow in anode and cathode flow fields 62', 78' may be completely sealed, e.g., by coating these sides with silicone, or other suitable sealing material. This is so because no fuel or oxidant flow occurs through these sides.

FIGS. 9–12 show an alternative embodiment of a fuel cell unit 320 of the present invention. As shown, housing 322 is substantially similar to housing 22 of FIG. 1. That is, housing 322 includes a circular sidewall 330 and a lower end wall 328 that includes oxidant inlet 396 and oxidant outlet 398 that fluidly communicate with a corresponding cathode inlet and outlet manifold regions 342, 344, which serve as the cathode inlet and outlet manifolds themselves. Housing 322 and fuel cell stack 324 also define anode inlet and outlet manifolds 338, 340, which similarly serve as the anode inlet and outlet manifolds. Not shown are a fuel inlet and a fuel outlet that communicate with anode inlet and outlet manifold regions 338, 340 via an upper end wall, also not shown. Those skilled in the art will appreciate that the fuel inlet 396 and outlet 398 and oxidant inlet and outlet need not be located as indicated, but rather may be located at any suitable locations.

Among the differences between fuel cell unit 320 and fuel cell unit 20 of FIGS. 1–6 is the use of a single plate for anode flow field structure 354 rather than the substantially sealed two-plate anode flow field structure 54 of FIGS. 1–6. Depending upon the type of fuel cell unit and the overall design of fuel cell unit 320, this difference can result in a reduction in the weight of the fuel cell unit. However, if fuel cell unit 320 is of the liquid fuel type, e.g., a direct methanol fuel cell, and the dimensions of fuel cell stacks 324, 24 and corresponding housings 322, 22 are substantially the same, the weight savings of single plate anode flow field structures 354 may be more than offset by the weight of additional fuel needed to fill entire anode inlet and outlet manifold regions 338, 340 rather than the self-contained inlet and outlet manifold regions 104, 106 of two-plate anode flow field structures 54.

Figure 10:
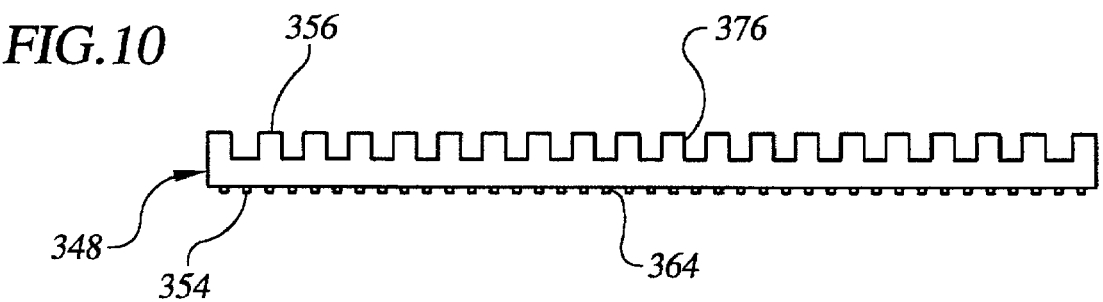
FIG. 10 is an elevational view of one of the bipolar plate assemblies of the fuel cell unit of FIG. 9.
Figure 11:
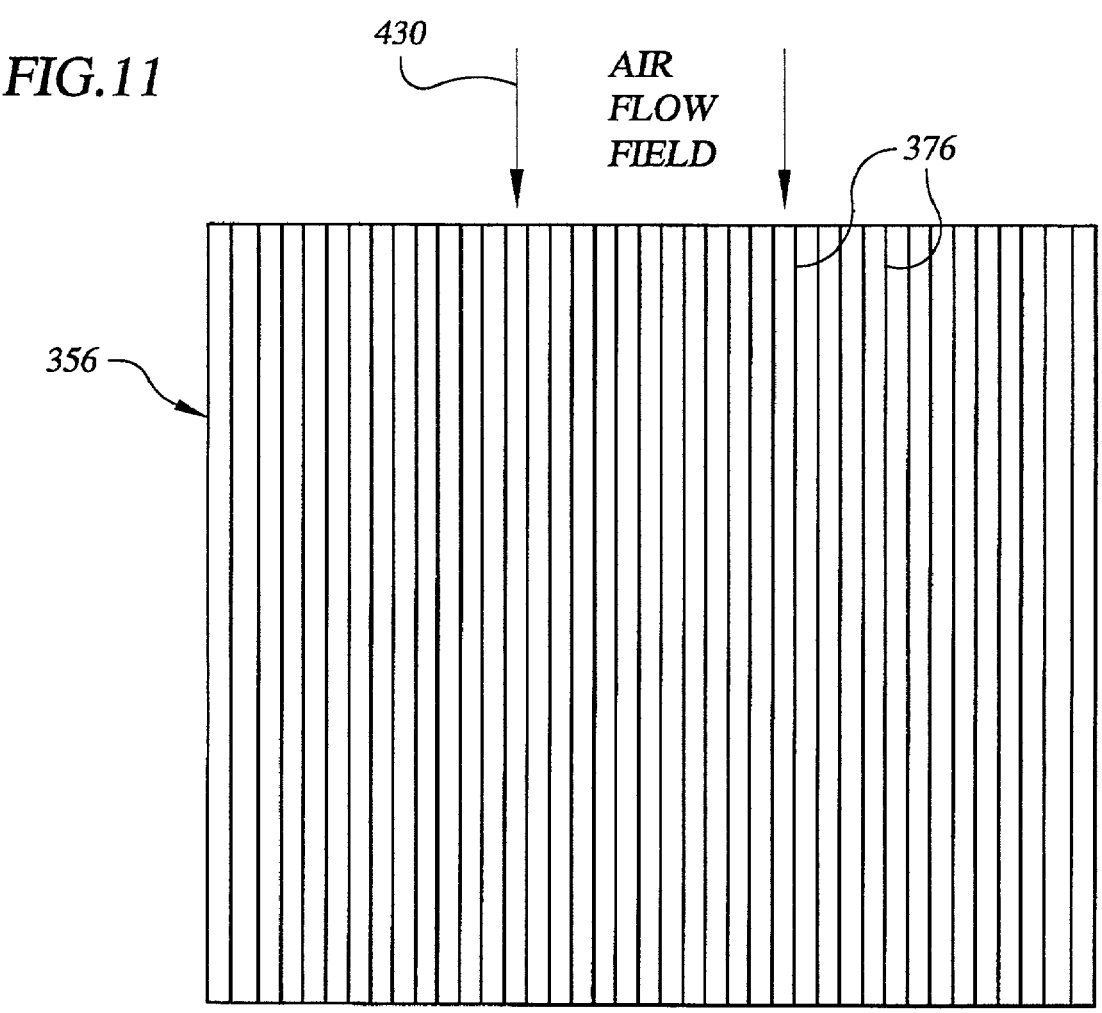
FIG. 11 is a plan view of the cathode flow field structure of the bipolar plate assembly of FIG. 10.
Figure 12:
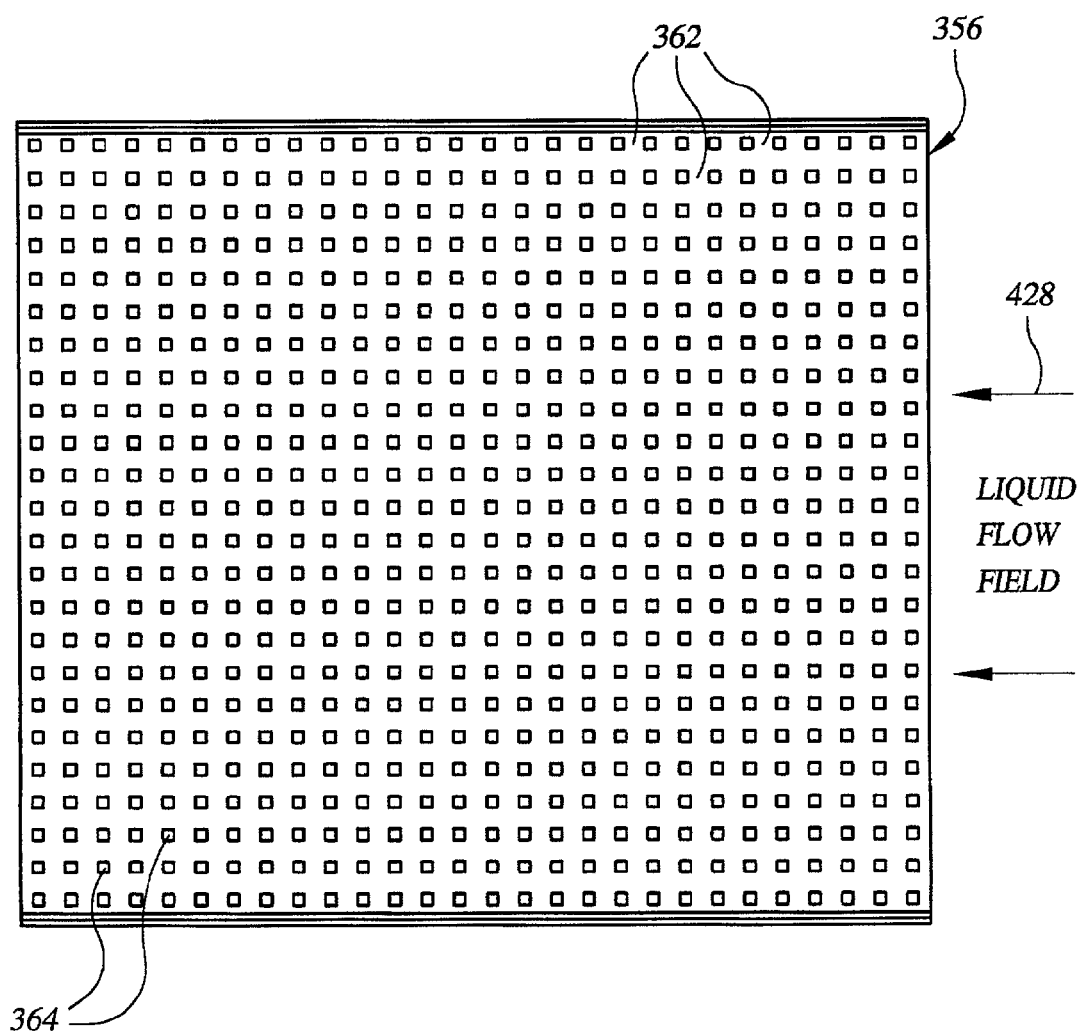
FIG. 12 is a plan view of the anode flow field structure of the bipolar plate assembly of FIG. 10.

As shown particularly in FIG. 10, each bipolar plate 348 generally comprises cathode flow field structure 356 and anode flow field structure 354. Referring to FIGS. 10 and 11, cathode flow field structure 356 may be made of a porous material similar to cathode flow field structure 56 described above in connection with FIGS. 1–6. Cathode flow field structure 356 may include a first side containing a plurality of channels 376 and a second side that is substantially planar. Channels 376 define the predominant direction of oxidant flow 430 through cathode flow field structure 356. Referring to FIGS. 10 and 12, anode flow field structure 354 of each bipolar plate 348 may be a plate similar to upper plates 58 of anode flow field structure 54 of the embodiment of FIGS. 1–6. Similarly, anode flow field structure 354 may contain a plurality of spacers 364 that may be either formed integrally with the anode flow field structure 354 by stamping, embossing, or another process, or formed separately and secured to the anode flow field structure by, e.g., welding, bonding or other means.

Anode flow field structure 354 may confront cathode flow field structure 356 so that spacers 364 extend in a direction away from the cathode flow field structure. To form fuel cell stack 324 using a plurality of bipolar plates 348, the bipolar plates may be stacked alternatingly with a membrane electrode assembly (not shown) such that channels 376 confront the cathodes in the membrane electrode assemblies and spacers 364 confront the anodes. The membrane electrode assembly may comprise any suitable electrolyte. However, if fuel cell unit is a direct methanol fuel cell unit, the membrane electrode assembly may include a PEM similar to PEM described above in connection with FIGS. 1–6. Each membrane electrode assembly may optionally be located adjacent to one or more porous layers, e.g., carbon fiber paper, similar to fuel cell stack of FIGS. 1–6.

Spacers 364 generally define a criss-cross pattern of channels that generally define anode flow field 362. However, the primary direction of fuel flow 428 through these channels is perpendicular to the longitudinal direction of channels 376 of cathode flow field structure 356. This is necessarily so due to the particular arrangement of anode and cathode manifold regions 338, 340, 342, 344 present in fuel cell unit 320 of FIG. 9. Those skilled in the art will recognize that alternative shapes of housing 322 and/or fuel cell stack 324 and/or alternative arrangements of manifold regions 336 may be used and that the flow patterns within anode and cathode flow fields 362, 378 may change accordingly.

FIG. 13 shows a fuel cell system 500 that includes a fuel handling system 502. Fuel handling system 502 is particularly described in connection with a direct methanol type fuel cell system that utilizes liquid methanol as the fuel. However, those skilled in the art will understand that fuel handling system 502 may be used with any hydrocarbon fuel that can be used in the form of a water solution. Fuel cell system 500 may include a fuel cell unit 504, which is represented in FIG. 13 by a partial fuel cell stack 506 comprising several bipolar plates 508 separated from one another by corresponding membrane electrode assemblies 510. Bipolar plates 508 and membrane electrode assemblies 510 may, but need not, be as described in connection with fuel cell units 20, 320 described above in connection with FIGS. 1–12. Each bipolar plate 508 generally includes an anode side having an anode flow field 512 and a cathode side having a cathode flow field 514. Of course, fuel cell unit 504 may comprise a sole anode flow field 512 and a sole cathode flow field 514 separated from one another by one membrane electrode assembly 510 in lieu of the plurality of bipolar plates 508 shown.

Fuel handling system 502 generally includes a fuel supply conduit 516 for supplying a water/methanol fuel solution to anode flow fields 512 of fuel cell stack 506 and a fuel return conduit 518 for recirculating the water/methanol solution through the fuel handling system. As used herein, and in the claims appended hereto, the term "conduit" includes any piping, tubing, manifolding, or other fluid-carrying structure. Fuel handling system 502 may include at least one recirculating pump 52 for circulating the water/methanol solution through fuel supply conduit 516, anode flow fields 512, and fuel return conduit 58, preferably at a relatively high flow rate. Recirculating pump 520 may generally be located at any point within fuel handling system 502 and may be any suitable pump, such as a centrifugal pump, a lobe pump, a screw pump, or a displacement pump, among others.

Fuel handling system 502 may also include a fuel injection system 522 that includes at least one fuel supply 524 for providing fuel handling system 502 with concentrated methanol in a concentration higher than the methanol concentration in the methanol/water solution supplied to fuel cell stack 506. Fuel supply 524 may be a tank or other storage reservoir. When fuel cell unit 504 is operating, a portion of the methanol ($CH_3OH$) in the methanol/water solution within anode flow fields 512 is stripped of its hydrogen atoms, e.g., by a catalyst (not shown) within each bipolar plate 508. The freed hydrogen atoms are then stripped of their electrons as they pass through each corresponding membrane electrode assembly 510 to create an electrical potential. Some of the remaining carbon and oxygen atoms combine to form carbon dioxide gas ($CO_2$), which remains in the methanol/water solution. Thus, some of the methanol is depleted from the recirculating methanol/water solution with each pass of the recirculating methanol/water solution through anode flow fields 512. Since it is desirable to provide fuel cell stack 506 with a predetermined optimal methanol concentration, additional methanol should be provided to the recirculating methanol/water solution to make up for the methanol used in the fuel cell stack.

Accordingly, fuel injection system 522 may include a control system 526 in communication with a methanol concentration sensor 528 and a regulating valve 530 located between fuel supply 524 and fuel supply conduit 516 for controlling the amount of concentrated methanol provided to the recirculating methanol/water solution. Control system 526 may monitor a signal from methanol concentration sensor 528 and actuate regulating valve 530 to control the flow rate of methanol into the recirculating methanol/water solution. Control system 526 may be any suitable digital or analog control system. Such control systems are well known in the art and, therefore, need not be described in detail. Methanol concentration sensor 528 may be any type of concentration sensor, such as the voltage-type sensor described in U.S. Pat. No. 4,810,597 to Kumagai et al., which is incorporated herein by reference. Regulating valve 530 may be any suitable type of controllable valve, such as a rotary valve or a gate valve, among others.

Fuel handling system 502 may further include a carbon dioxide separator 532, or gas scrubber, for separating the carbon dioxide from the methanol/water solution exiting fuel cell stack 506. Carbon dioxide separator 532 may be located upstream of recirculating pump 520 so that the carbon dioxide gas does not interfere with the operation of the pump. Carbon dioxide separator 532 may include a housing 534 having an upstream chamber 536, a downstream chamber 538, and a carbon dioxide vent 540 in fluid communication with the upstream chamber. Downstream chamber 538 may be separated from upstream chamber by microporous element 542 having a bubble point greater than the suction head of recirculating pump 520. Accordingly, as recirculating pump 520 draws the methanol/water solution through microporous element 542, the carbon dioxide gas is trapped in upstream chamber 536, where it is vented through carbon dioxide vent 540. It is noted that the carbon dioxide gas vented via carbon dioxide vent 540 may include methanol vapor. This methanol vapor may be handled as described below in connection with the oxidant handling system of FIG. 14. Housing 534 may be made of any suitable material, such as Nuryl or polycarbonate, among others. Microporous element 542 may also be any shape, such as tubular, and may be made of any suitable porous material that is wettable by the methanol/water solution. Although fuel handling system 502 is shown with carbon dioxide separator having microporous element 542, the carbon dioxide separator may be any suitable type known in the art.

In addition, fuel handling system 502 may include water recycling system 544 for recycling water from cathode flow fields 514 produced by the oxidation of the hydrogen ions that pass through membrane electrolyte assemblies 510 and water that crosses the membrane electrolyte assemblies due to electro-osmotic drag. Water recycling system 544 may include a water recycling conduit 546 in fluid communication with cathode flow fields 514 at its upstream end and recirculating pump 520 at its downstream end. Recirculating pump 520 generally provides the suction that draws the water through water recycling system 546.

FIG. 14 shows fuel cell system 500 in conjunction with an oxidant handling system 600. Like fuel handling system 502, oxidant handling system 600 is particularly described in connection with a direct methanol type fuel cell system that utilizes air as the oxidant. However, those skilled in the art will understand that oxidant handling system 600 may be used with other types of oxidants, such as pure oxygen, among others, that may be supplied from a pressurized tank.

Oxidant handling system 600 generally includes an oxidant supply conduit 602 for supplying oxidant gas to cathode flow fields 514 of fuel cell stack 506 and an exhaust gas conduit 604 for exhausting air and gaseous products of the electrochemical process from the cathode flow fields. Oxidant handling system 600 may also include a methanol cleanup system 606 in fluid communication with carbon dioxide vent 540 (FIG. 13) of fuel handling system 502. As mentioned above, the carbon dioxide vented from fuel handling system 502 may contain methanol vapor. Accordingly, oxidant handling system 600 may be provided with methanol cleanup system 606 to remove this methanol vapor from fuel cell system 500. For various reasons, it may be desirable to prevent, or otherwise limit the amount of, methanol vapor exhausted into the environment surrounding fuel cell system. Methanol cleanup system 606 may include a conduit 608 for conducting the carbon dioxide and methanol vapor from carbon dioxide vent 540 (FIG. 13) and a catalyst 610, e.g., a precious metal, such as platinum, that causes the methanol vapor to react with oxygen to form carbon dioxide and water, which are then exhausted from oxidant handling system along with the gases from cathode flow fields 514. Oxidant handling system 600 may further include a blower 612 to force air through cathode flow fields exhaust gas conduit and methanol cleanup system. Blower may be any type of blower such as an inline fan or a centrifugal fan. Of course, if the oxidant is pure oxygen supplied from a pressurized tank, blower 612 may be eliminated.

Figure 15:
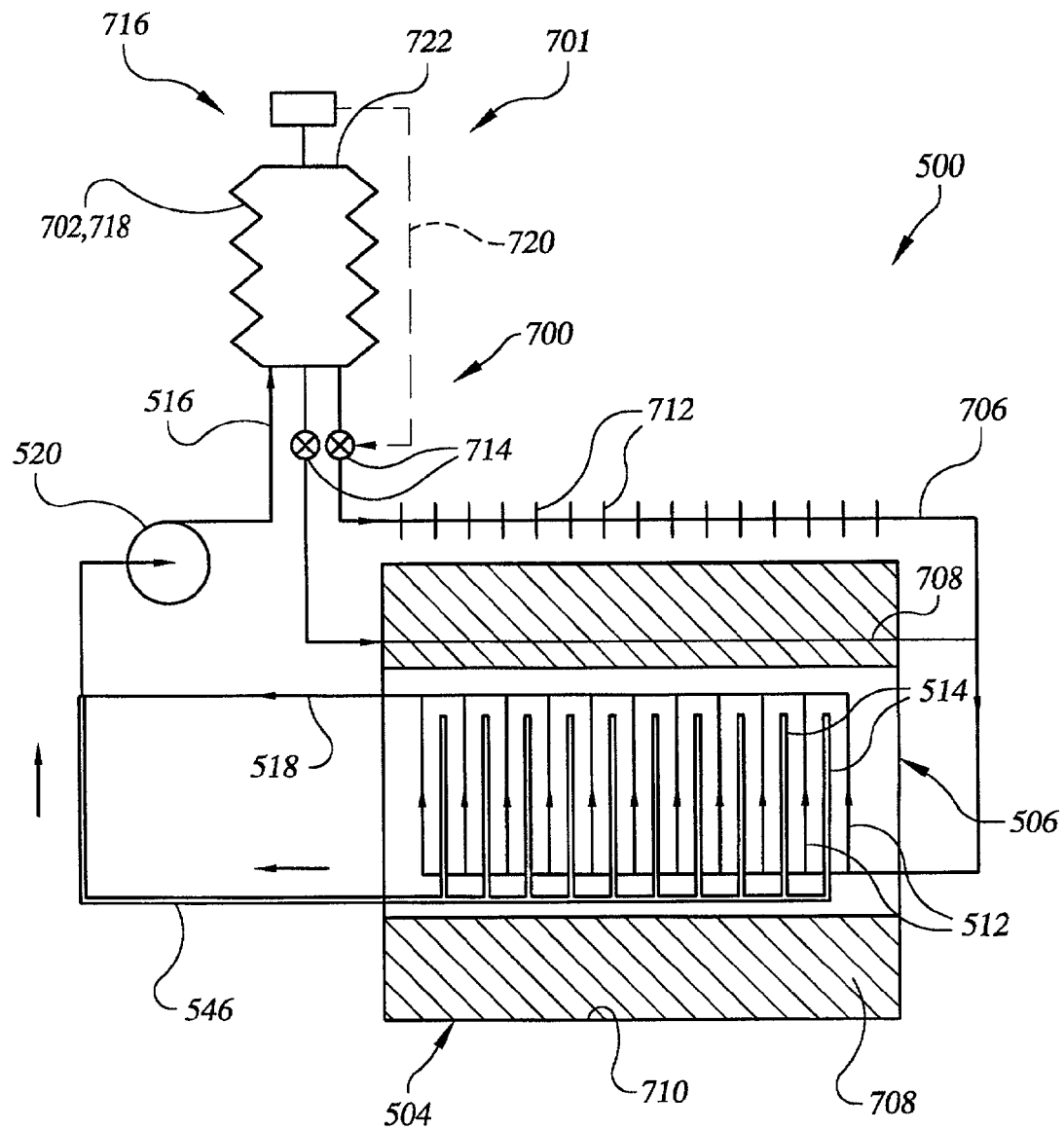
FIG. 15 is a schematic diagram of a liquid inventory control system of the present invention.

FIG. 15 shows fuel cell system 500 that includes a liquid inventory system 700 for regulating the balance of water in fuel cell unit. Liquid inventory system 700 can play important role in reducing the overall weight of fuel cell system 500. This is so because water lost from fuel cell system 500, e.g., by evaporation and exhaustion from oxidant system 600 (FIG. 14) would otherwise have to be replaced with water from a relatively massive, carry-along water supply. This approach would be detrimental, particularly for fuel cell systems that must be as lightweight as possible. With respect to a direct methanol fuel cell system, maintaining a constant water inventory is possible, despite inevitable water transport from the fuel cell stack, because one byproduct of the reactions within a direct methanol fuel cell is water. A net two moles of water is produced for every mole of methanol consumed. Achieving a water-balanced operation generally requires a liquid inventory control system 700 to recover water from cathode flow fields 514 of fuel cell stack 506 and carefully controlling the operating conditions, e.g., methanol concentration in the methanol/water solution and temperature, of the fuel cell stack. Importantly, liquid inventory control system 700 should collect water from cathode flow fields 514 that cross membrane electrode assemblies due to electro-osmotic drag.

Referring to FIG. 15, and also to FIG. 13, liquid inventory control system 700 may comprise recirculating pump 520, fuel return conduit 518, and water recycle conduit 546. As discussed above, recirculating pump 520 provides the methanol/water solution to the inlet side of anode flow fields 512, preferably at a relatively high flow rate, and recirculates the methanol/water solution through fuel handling system 502. Recirculating pump 520 also provides a suction to outlet side of cathode flow fields 514 to prevent backflow of the methanol/water solution into the cathode flow fields. When cathode flow field 514 of each bipolar plate 508 is defined by a cathode flow field structure 548, made of a porous material, such as PPG discussed above in connection with FIGS. 1–12, the suction head of recirculating pump 520 is preferably less than the bubble point of the porous material. In this manner, the porous cathode flow field structures 548 remain wetted and recirculating pump 520 will draw only excess water from cathode flow field 514. Porous cathode flow field structures 548 should be hydrophilic to allow them to wick water away from membrane electrode assemblies 510 and remain wetted. Thus, a porous cathode flow field structure 548 of this type may be considered a wick. Passageways (not shown) similar to passageways 100 (FIG. 6) may be used to allow access for wicks around sealing members 82 (FIG. 4) to contact the porous cathode flow field structure 548, if such a sealing detail is provided.

Liquid inventory control system 700 may also include a sensor 701 to measure the liquid inventory. Sensor 701 can consist of any mechanical or electronic device that can produce a control signal in response to the amount of liquid, e.g., methanol/water solution, in fuel cell system 500. Sensor 701 may comprise an accumulator 702 for accumulating excess methanol/water solution in fuel handling system 502. Accumulator 702 may be located downstream of fuel return conduit 518 and water recycling conduit 546, e.g., in fuel supply conduit 516 of FIG. 13 downstream of, and in fluid communication with, recirculating pump 520. It is noted that FIG. 13 shows only a sole line representing fuel supply conduit 516. However, a portion of fuel supply conduit 516 may include two or more pipes, tubes, or other conduits, such as a warm fuel delivery conduit 704 and a cool fuel conduit 706, extending between accumulator 702 and inlet side of anode flow fields 512. In this manner, liquid inventory control system 700 may be used to control not only the balance of water in fuel cell system 500 but also control the temperature of fuel cell stack 506.

In this connection, fuel cell unit 504 may include thermal insulation 708 surrounding fuel cell stack 506 to create an insulated region 710. Accordingly, a relatively large portion of warm fuel supply conduit 704 may be located within insulated region 710 to keep the methanol/water solution carried therein relatively warm. In contrast, a relatively large portion of cool fuel supply conduit 706 may be located outside insulated region 710 to allow the methanol/water solution carried therein to become relatively cool. Cool fuel supply conduit 706 may be augmented with one or more cooling devices 712, such as a radiator or fins, to further effect the cooling of the methanol/water solution carried by the cool fuel supply conduit. The methanol/water solution carried by cool fuel supply conduit 706 may be cooled as much as required for a particular design, down to about the temperature of the ambient environment outside of insulated region 710.

The temperature of methanol/water solution delivered to anode flow fields 512 may be controlled in a number of ways, such as by controlling one or more control valves 714 located in warm and cool fuel supply conduits 704, 706 that extend between accumulator 702 and the anode flow fields 512. Each control valve 714 may be any type of valve, such as the various types described above in connection with valve of fuel injection system.

A control system 716 may be used to actuate one or more of control valves 714 in response to the methanol/water solution inventory needs of fuel cell stack 506. In one embodiment, wherein accumulator 702 is a variable volume reservoir, e.g., bellows 718, control system 716 may be the bellows in conjunction with an actuator link 720 extending between the movable end 722 of the bellows and at least one of control valves 714, e.g., the control valve for cool fuel supply conduit 706. If the temperature of fuel cell stack 506 is too low, then bellows 718 will begin to accumulate methanol/water solution therein and begin to expand such that movable end moves away from control valves 714, which remain relatively fixed. In response to the movement of movable end 722 of bellows 718, actuator link 720, or other motion sensor, actuates control valve 714 of cool fuel supply conduit 706 so that less methanol/water solution flows through the cool fuel supply conduit 706. In response, fuel cell stack 506 will warm up so that more water will evaporate and be exhausted from fuel cell system 500. Likewise, if fuel cell stack 506 is too hot, control system 716 will cause more methanol/water solution to flow through cool fuel supply conduit 706 so that the fuel cell stack 506 cools and evaporates less water. Those skilled in the art will appreciate that control system 716 may actuate control valve 714 of warm fuel supply conduit 704, alone or in combination with control valve 714 of cool fuel supply conduit 706, in a similar, albeit opposite, manner to achieve similar results.

In an alterative embodiment, sensor 701 may send via control system 716 a control signal to a cooling fan that blows air across cool fuel supply conduit 706, or alternatively, sole fuel supply conduit 516 (FIG. 13), and any cooling devices 712, such as cooling fins, that may be present on the fuel supply conduit(s). Thus, if the methanol/water solution is accumulating in fuel cell system 500, then control system 716 would decrease the fan speed. This would allow fuel cell system 500 to warm up and evaporate water at a higher rate.

As mentioned, actuator link 720 may be replaced by a suitable sensor to detect the accumulation of methanol/water solution in accumulator 702. In conjunction, a separate control valve actuator (not shown) may also be provided. If accumulator 702 is bellows 718, a suitable sensor may be a motion sensor or displacement sensor, among others. Those skilled in the art will understand the variety of different types of sensors that may be used with different types of accumulators 702. For example, if accumulator 702 is a fixed reservoir, e.g., a rigid-walled tank, the sensor may be a sensor that detects the relative level of the surface of the methanol/water solution within the reservoir. Depending upon the type of control valve(s) 714, corresponding control valve actuator(s) may be of the rotary or linear type among others. Although liquid inventory system 700 is shown in conjunction with recirculating a fuel solution through anode flow fields 512, certain aspects of the fluid inventory control system may be used to cool fuel cell stack 506 by circulating water or other coolant through cathode flow field 514 or a coolant flow field (not shown) in a similar manner to regulate the operating conditions of the stack. Those skilled in the art will appreciate the changes necessary to implement such systems.

As mentioned, the operating conditions of fuel cell stack 506 affect the net gain or loss of water from fuel cell system 500. The main loss mechanism for water is its evaporation from cathode flow fields 514 and the transport of the resulting water vapor out of fuel cell stack 506 along with the other gases exhausted from the cathode flow fields (see FIG. 14 and accompanying description). The exhaust gas is typically saturated with water, so that the temperature of fuel cell stack 506 and the flow rate of gas through cathode flow fields 516 are critical parameters for maintaining water-balanced operation. In addition to liquid inventory system described above in connection with FIG. 15, additional measures may be taken to conserve water, if needed. For example, exhaust gases can be at least partially recirculated through cathode flow fields 514 to maintain a relatively high humidity within the cathode flow fields without a large rate of water vapor loss. In addition, a condenser (not shown) may be installed in exhaust gas conduit 604 (FIG. 14) to recover water from the exhaust gas. The recovered water could then be returned to the suction side of recirculating pump 520, e.g., using a wick or other device that prevents gases from entering fuel handling system 502 (FIG. 13).

While the present invention has been described in connection with a preferred embodiment, it will be understood that it is not so limited. On the contrary, it is intended to cover all alternatives, modifications and equivalents as may be included within the spirit and scope of the invention as defined above and in the claims appended hereto.

What is claimed is:

1. A fuel cell unit, comprising:
   a first flow field structure having a first electrical type that is either an anode-type or a cathode-type;
   a membrane electrode assembly located adjacent said first flow field structure, said membrane electrode assembly including first and second diffusion layers and an ion conducting membrane located therebetween;
   a flow field wick having a second electrical type that is either said anode-type or said cathode-type, said second electrical type being opposite said first electrical type of said first flow field structure, said flow field wick located adjacent said membrane electrode assembly opposite said first flow field structure and comprising a layer that includes:
      a first face located adjacent said membrane electrode assembly;
      passageways for wicking a liquid to said membrane electrode assembly during use of the fuel cell unit; and
      at least one channel for conducting the liquid in a direction substantially parallel to said first face during use of the fuel cell unit; and
   a second flow field structure of said first electrical type, said second flow field structure located adjacent said flow field wick opposite said membrane electrode assembly without an intermediate anode flow field or cathode flow field located therebetween.

2. A fuel cell unit according to claim 1, wherein said first and second flow field structures are of the anode-type.

3. A fuel cell unit according to claim 1, wherein said flow field wick includes a second face spaced from said first face and said at least one channel comprises at least one groove formed in said second face.

4. A fuel cell unit according to claim 3, wherein said first face directly confronts said membrane electrode assembly.

5. A fuel cell unit according to claim 1, wherein said flow field wick comprises porous pyrolytic graphite.

6. A fuel cell unit according to claim 1, wherein each of said first and second flow field structures comprises a stamped metal plate.

7. A fuel cell unit according to claim 1, wherein each of said first and second flow field structures comprises first and second plates that together define a corresponding flow field.

8. A fuel cell unit according to claim 7, wherein said first and second plates are made of metal.

9. A fuel cell unit according to claim 7, wherein said first plate includes a plurality of integrally formed spacers defining a space between said first plate and said second plate for said corresponding flow field.

10. A fuel cell unit according to claim 9, wherein said plurality of spacers comprise embossments formed on said first plate.

11. A fuel cell unit according to claim 7, wherein said second plate contains a plurality of apertures in fluid communication with said membrane electrode assembly.

12. A fuel cell unit according to claim 7, wherein said first plate comprises a plurality of integrally formed spacers defining a space between said first plate and said second plate for said corresponding flow field and said second plate contains a plurality of apertures in fluid communication with said membrane electrode assembly.

13. A fuel cell unit according to claim 7, wherein said first and second plates each includes a peripheral region and said first and second plates are fluidly sealed with one another at said peripheral regions so as to partially define said corresponding flow field.

14. A fuel cell unit according to claim 13, wherein said peripheral region of said first plate and said peripheral region of said second plate are joined to one another and sealed by a crimped joint.

15. A fuel cell unit according to claim 1, wherein the fuel cell unit is a direct methanol fuel cell unit.

16. A fuel cell unit according to claim 15, wherein said flow field wick has an outer periphery and said first and second flow fields structures are manifolded radially outward of said outer periphery.

17. A fuel cell unit according to claim 7, wherein each of said first plates includes a first manifold aperture and each of said second plates includes a second manifold aperture coaxial with said first manifold aperture.

18. A fuel cell unit according to claim 17, wherein said corresponding flow field is substantially planar and at least one of said first and second manifold apertures is formed in a manifold embossment having a central axis substantially perpendicular to said corresponding flow field.

19. A fuel cell unit according to claim 17, wherein said manifold embossment includes a thin-walled cylindrical portion.

20. A fuel cell unit according to claim 1, wherein each of said first and second flow field structures includes a first manifold outlet and a second manifold outlet, wherein said first and second flow field structures are in fluid communication with one another via said first and second manifold outlets.

21. A fuel cell unit according to claim 20, further comprising a manifold sealing member located between each of corresponding ones of said first and second manifold outlets of said first and second flow field structures.

22. A fuel cell unit according to claim 20, wherein said corresponding flow field is substantially planar and each of said first and second manifold outlets is formed in a manifold embossment having a central axis substantially perpendicular to said corresponding flow field.

23. A fuel cell unit according to claim 22, wherein each of said manifold embossments includes a thin-walled cylindrical portion.

24. A fuel cell unit according to claim 23, wherein said cylindrical portions of said manifold embossments of said first and second flow field structures engage one another so that one surrounds the other.

25. A fuel cell unit according to claim 24, wherein a sealing member is positioned between said corresponding engaged ones of said cylindrical portions.

26. A fuel cell unit according to claim 1, wherein said flow field wick has an outer periphery and each of said first and second flow field structures has a portion extending beyond said outer periphery of said flow field wick, the fuel cell unit further comprising a sealing member located radially outward of said outer periphery of said flow field wick and confronting said portions of said first and second flow field structures extending beyond said outer periphery of said flow field wick.

27. A fuel cell unit according to claim 26, wherein said sealing member is an O-ring.

28. A fuel cell unit according to claim 26, wherein one of said first and second flow field structures includes a plurality of depressions formed therein to provide a plurality of passageways that circumvent said sealing member.

29. A fuel cell unit according to claim 28, wherein each depression is coated with a hydrophobic coating.

30. A fuel cell unit according to claim 26, wherein said membrane electrode assembly has a portion captured between a corresponding sealing member and one of said first and second flow field structures.

31. A fuel cell unit, comprising:
a first anode flow field structure;
a membrane electrode assembly located adjacent said first anode flow field structure;
a cathode flow field wick located adjacent said membrane electrode assembly opposite said first anode flow field structure and comprising:
a first face located adjacent said membrane electrode assembly;
at least one channel for conducting an oxidant in a direction substantially parallel to said first face during use of the fuel cell unit; and
passageways for wicking liquid to said membrane electrode assembly from said at least one channel during use of the fuel cell unit; and
a second anode flow field structure located adjacent said cathode flow field wick opposite said membrane electrode assembly without an intermediate cathode flow field located therebetween.

32. A fuel cell unit according to claim 31, wherein said membrane electrode assembly includes first and second diffusion layers and a proton exchange membrane located therebetween.

33. A fuel cell unit according to claim 31, wherein each of said first and second anode flow field structures comprises a pair of plates defining a corresponding anode flow field.

34. A fuel cell unit according to claim 33, wherein said pair of plates are sealed with one another at a peripheral seal.

35. A fuel cell unit according to claim 34, wherein said peripheral seal comprises a crimped seal.

36. A fuel cell unit according to claim 31, wherein said cathode flow field wick includes a second face spaced from said first face and said at least one channel comprises at least one groove formed in said second face.

37. A fuel cell unit according to claim 31, wherein said first anode flow field is located immediately adjacent said membrane electrode assembly.

38. A fuel cell unit according to claim 31, wherein said cathode flow field wick is located immediately adjacent said membrane electrode assembly.

39. A fuel cell unit according to claim 31, wherein said cathode flow field wick comprises a porous pyrolytic graphite layer, said at least one channel formed within said porous pyrolytic graphite layer.

40. A fuel cell unit, comprising:
a first anode flow field structure;
a membrane electrode assembly located adjacent said first flow field structure;

a cathode flow field wick located adjacent said membrane electrode assembly opposite said first anode flow field structure and comprising:
   a first face confronting said membrane electrode assembly;
   a second face spaced from said first face, said second face containing at least one groove for conducting an oxidant in a direction substantially parallel to said first face during use of the fuel cell unit; and
   pores extending from said first face for wicking liquid from said membrane electrode assembly; and
a second anode flow field structure located adjacent said cathode flow field wick opposite said membrane electrode assembly without an intermediate cathode flow field located therebetween.

41. A fuel cell unit according to claim 40, wherein said membrane electrode assembly includes first and second diffusion layers and a proton exchange membrane located therebetween.

42. A fuel cell unit according to claim 40, wherein each of said first and second anode flow field structures comprises a pair of plates defining a corresponding anode flow field.

43. A fuel cell unit according to claim 42, wherein said pair of plates are sealed with one another at a peripheral seal.

44. A fuel cell unit according to claim 43, wherein said peripheral seal comprises a crimped seal.

45. A fuel cell unit according to claim 40, wherein said first anode flow field is located immediately adjacent said membrane electrode assembly.

46. A fuel cell unit according to claim 40, wherein said cathode flow field wick is located immediately adjacent said membrane electrode assembly.

47. A fuel cell unit according to claim 40, wherein said cathode flow field wick comprises a porous pyrolytic graphite layer, said at least one channel formed within said porous pyrolytic graphite layer.

* * * * *